(12) United States Patent
Buchner

(10) Patent No.: US 6,347,682 B1
(45) Date of Patent: Feb. 19, 2002

(54) ELECTRIC DRIVE UNIT FOR A BICYCLE

(76) Inventor: Johannes Buchner, Unteraumühlweg 8, A-5400 Hallein (AT)

( * ) Notice: Subject to any disclaimer, the term of this patent is extended or adjusted under 35 U.S.C. 154(b) by 0 days.

(21) Appl. No.: 09/599,506

(22) Filed: Jun. 23, 2000

(30) Foreign Application Priority Data

Jun. 24, 1999 (AT) .............................................. 1109/99

(51) Int. Cl.[7] .............................................. B60K 1/00
(52) U.S. Cl. ...................... 180/220; 180/65.5; 180/205; 180/206
(58) Field of Search ................................ 180/220, 206, 180/205, 65.1; 411/539, 546, 399, 973, 169; 474/101, 135, 133

(56) References Cited

U.S. PATENT DOCUMENTS

| | | | |
|---|---|---|---|
| 4,267,898 A | | 5/1981 | Wheaton |
| 4,979,927 A | * | 12/1990 | Tabori et al. ................. 474/114 |
| 5,256,112 A | * | 10/1993 | Thomey et al. ............. 474/112 |
| 5,551,927 A | * | 9/1996 | Enzmann et al. ............ 475/265 |
| 5,937,964 A | * | 8/1999 | Mayer et al. ................. 180/220 |
| 6,024,186 A | * | 2/2000 | Suga ............................. 180/291 |
| 6,155,369 A | * | 12/2000 | Whittaker .................... 180/220 |
| 6,173,801 B1 | * | 1/2001 | Kakutani et al. ............ 180/220 |

FOREIGN PATENT DOCUMENTS

| | | |
|---|---|---|
| FR | 875752 | 10/1942 |
| FR | 878837 | 2/1943 |
| GB | 2164615 | 3/1986 |

* cited by examiner

Primary Examiner—Anne Marie Boehler
Assistant Examiner—Tony Winner
(74) Attorney, Agent, or Firm—Dykema Gossett PLLC

(57) ABSTRACT

A drive unit for a bicycle with an electric motor or a geared motor that may be affixed to a frame tube of the bicycle by means of a holder and with a toothed belt for transmission of the torque onto a sheave attached on a wheel of the bicycle. On its side that is turned away from the spokes, the sheave is provided with one or several radial projections to prevent the belt from running off. The sheave having a central opening is centered for concentricity with the axle of the wheel and is attached to the wheel spokes of the bicycle.

10 Claims, 3 Drawing Sheets

Ansicht A

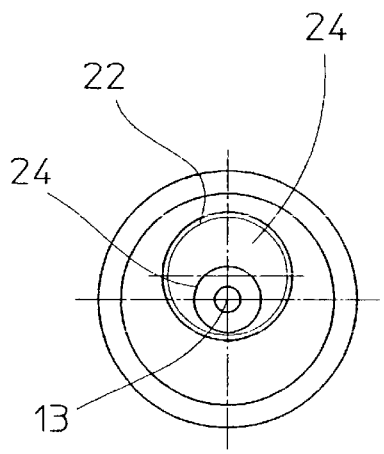
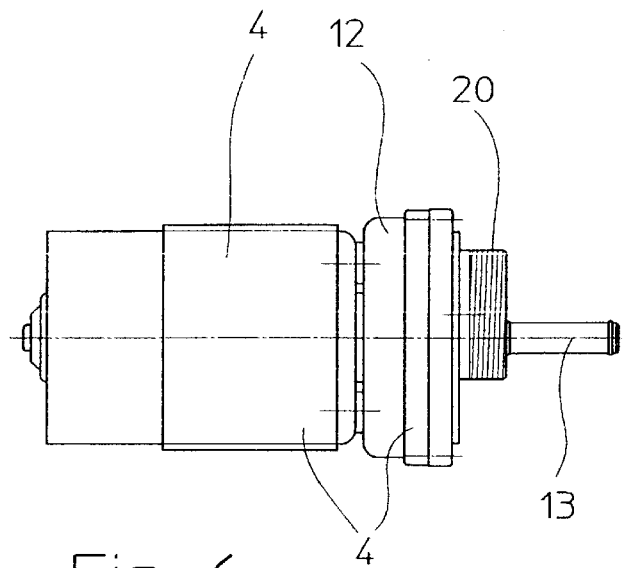
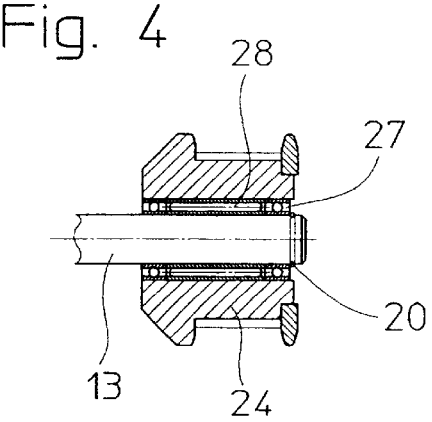
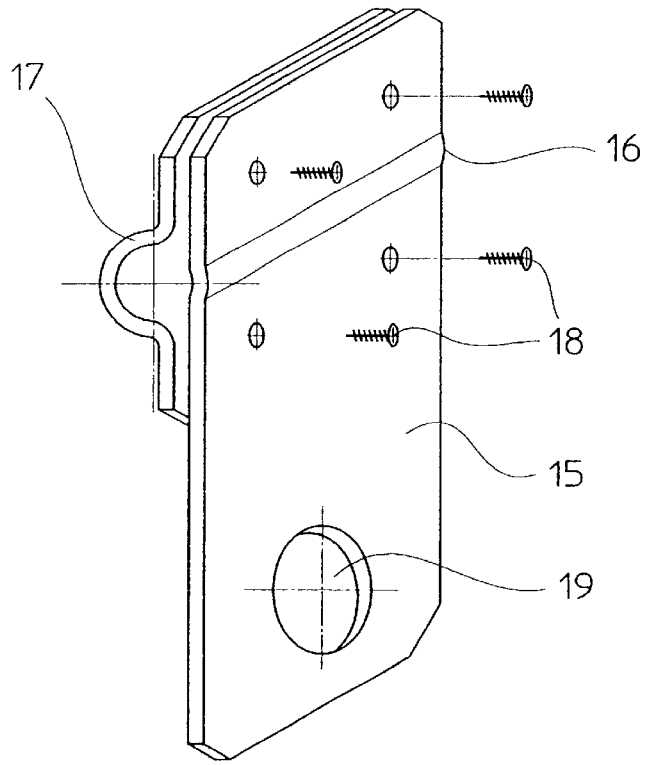
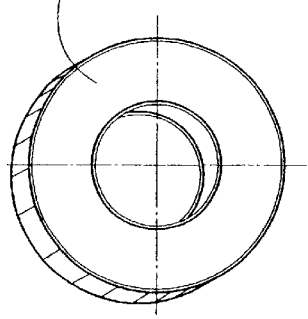

ELECTRIC DRIVE UNIT FOR A BICYCLE

BACKGROUND OF THE INVENTION

The invention relates to an electric drive unit for a bicycle.

DESCRIPTION OF PRIOR ART

Such devices have been disclosed in FR 875 752 and in FR 878 837 for example. Internal combustion engines are used to that effect. The disadvantage thereof is that they cannot be switched on and off during the ride, since an internal combustion engine always has to be started first. This occasions unnecessary noise and fuel consumption. Additionally, abrupt stopping often kills the engine. These applications suggest using chain drives. The drawback of a chain drive however is that it has to be lubricated and that the parts used are of metal, which makes them considerably heavier than if they were made of plastic for example. Moreover, the small chain drive wheel cannot be as small as a toothed belt pulley.

Furthermore, these well-known drives cannot be mounted on all customarily employed bicycles. The application FR 878 837 cannot, indeed, be mounted on bicycles styled for girls or women, since the upper crossbar would be in the way. The device disclosed in FR 875 752 requires a radical alteration of the way of driving, since the center of gravity is shifted well rearward, or, if this drive is mounted on a modern, light bicycle, such as a mountain bike for example, there is the risk that the bicycle turns over upon dismounting.

Similar drives have been disclosed in GB 2 164 615 A and U.S. Pat. No. 4,267,898. In these units, the drive pulleys are not affixed to the spokes of the bicycle, so that, as a result, such a drive pulley is more solid and has to be of a heavier design since it cannot rest on the spokes. Additionally, they can only be attached with the help of auxiliary parts. These drives use fanbelts or V belts that have the disadvantage of a certain slip, wherein said slip may become a problem, especially in wet weather.

All these prior-art devices are very heavy and big in size and hence more expensive than they would be if they were small and of a simpler design.

SUMMARY OF THE INVENTION

The object of the present invention is to provide an extremely simple, light, ecological and inexpensive auxiliary drive for all customarily employed bicycles. Furthermore, the transmission of the torque onto the bicycle's wheel should not slip and be maintenance-free and the driving behavior should not noticeably worsen.

According to the invention, the auxiliary drive employs a toothed belt. The drive gear of the belt may be of a much smaller size than the drive gear of a chain drive gear. Accordingly, my device permits a greater gear reduction ratio. As a result, an extremely small, light and inexpensive electric motor may be employed, preferably one with a planetary gear seat flanged thereon. Such a motor is known from modern drilling machines operated on battery for example. By means of a simple clamping holder, this very small geared motor can be directly attached, without disturbing, to various places on the bicycle's frame, on the support tube for example. The device can thereby be designed to drive the front wheel and/or the rear wheel of the bicycle. When using a great sheave, the forces occurring, like, e.g., the pulling force of the belt, are extremely small, so that the dimensions of the attachment means for the motor can be extremely small and light. Moreover, an extremely inexpensive plastic disk may be used for the sheave, said plastic disk remaining light even if its dimensions are greater to meet a greater gear reduction ratio. Since the sheave on the belt supporting ring is directly attached to the inner side of the wheel spokes, the torque is transmitted to the bicycle's wheel and, additionally, the sheave is supported by the spokes. The spokes also prevent the toothed belt from running off inside.

This sheave, which has a relatively great diameter, is simply centered for concentricity with the axle of the wheel by positioning it onto the bicycle's wheel. This is no problem with bicycle wheels that have an outer hub collar, surrounding the central opening of the sheave. This outer hub collar however is missing on most of the new bicycle wheels. For these, the sheave is therefore provided with centering pins arranged in a centric manner around the center, said pins projecting between the spokes and sitting close to the outer periphery of the hub flange.

The sheave is also provided on its outer periphery with a collar intended to prevent the belt from running off, which is well possible due to bumps during the ride.

With only one collar, the sheave may be manufactured with a circumferential toothed bearing surface for the belt by means of an injection die that is very simple in construction. This device permits a great gear reduction ratio onto the drive wheel that is extremely reasonably priced and that does not slip.

To attach the sheave onto the spokes, cable connectors are preferably employed. The sheave may thus be positioned in a very short period of time even by laymen. To attach the sheave, a centrical ring of openings having various outlines may be provided, said openings being arranged relative to the wheel spokes in a way such that the cable connectors are guided through two openings each in order to loop the spokes positioned therein between.

Another object of the invention is not to be detrimental to the usual chain drive with hub clutch or derailleur and to permit the drive to occur ad lib by physical strength and/or by electric drive with a minimum of frictional losses.

To fit this purpose a sleeve type free-wheeling is provided between the drive shaft of the motor or geared motor and the drive wheel, which is carried and runs thereon. As a result, the drive shaft and the drive wheel are connected to rotate in unison by means of clamps when the motor is driving. The freewheeling spins when there is no drive.

A fastener with a location hole that may be attached to a tubular frame member is provided for fastening the geared motor or the electric motor so that the belt may be put under tension or slackened, a protruding threaded stem arranged eccentric to the drive shaft of the motor or geared motor engaging said location hole and being fastened with a screw nut. Once the nut has been slacked and the motor or the geared motor has been turned about its axis, the belt may be put under tension or slackened. Thanks to this way of fastening, the belt may very easily be put under tension even after a change of tire.

The belt may be taken off the drive wheel so that any friction whatsoever that might be occasioned by the belt is excluded during transmission of the torque. In order to attach the detached toothed belt onto the sheave on the bicycle's wheel, the sheave is preferably provided with pilot pins projecting between the spokes onto which the toothed belt is fixed by forming a loop. This possibility reduces frictional loss to zero and the tire may be changed just as easily as without additional drive. Transmission of the torque to the driven wheel of the bicycle may thus be established and removed again in a fast manner that does not imply any complicated measure.

BRIEF DESCRIPTION OF THE DRAWINGS

An embodiment of the drive unit for a bicycle according to the invention is described in the following by way of example with the help of the drawing.

FIG. 3 shows a lateral view of the motor with planetary gear set;

FIG. 4 shows a view of the front side of the planetary gear set with eccentric threaded stems and drive shaft;

FIG. 5 shows a section through the toothed belt drive pulley on the drive shaft of the planetary gear set;

FIG. 6 shows a perspective view of the fastener with a clip;

FIG. 7 shows a perspective view of the knurled nut that may be screwed onto the eccentric threaded stem;

DETAILED DESCRIPTION OF THE PREFERRED EMBODIMENTS

Figure 1:
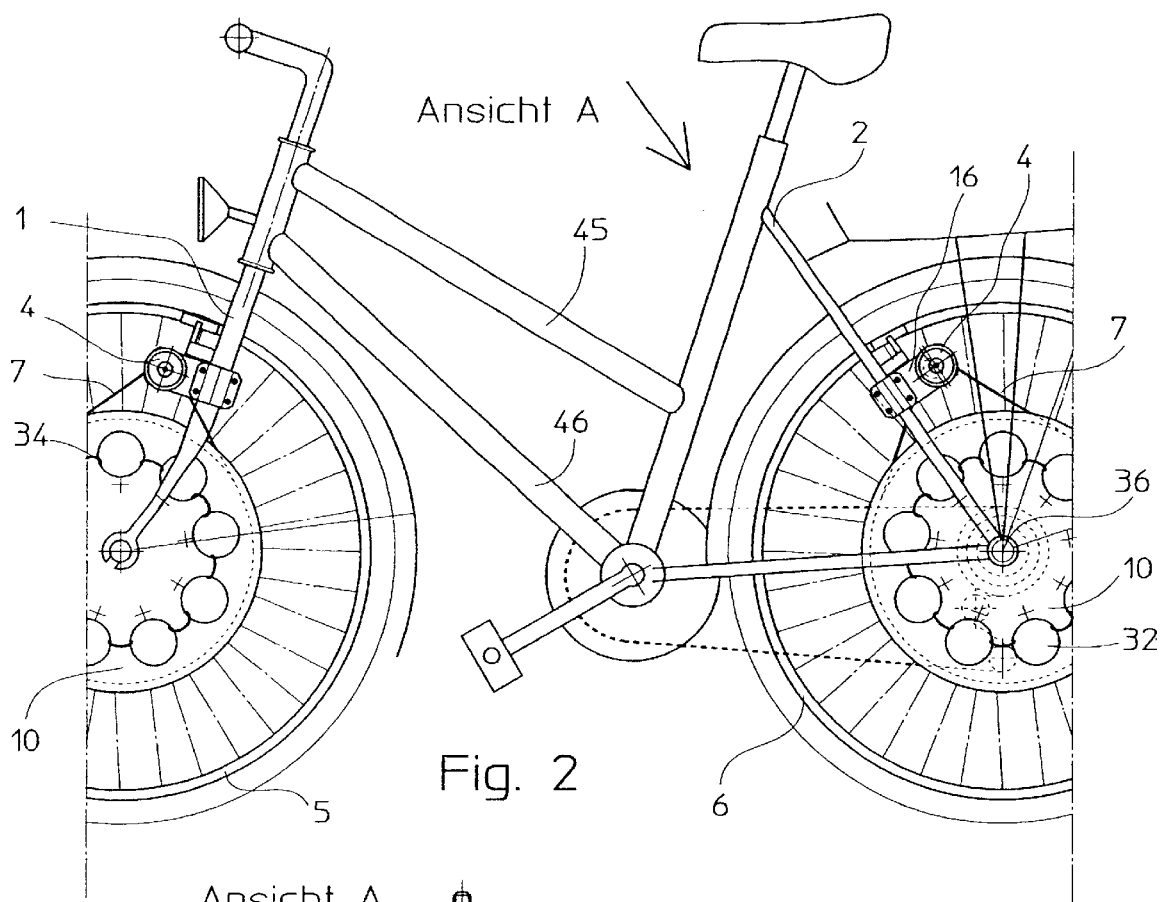
FIG. 1 shows a partial side view of a bicycle.

According to FIG. 1, a geared motor 4 or an electric motor (not shown) for driving the front wheel 5 and/or the rear wheel 6 is fastened on one side of the front fork tube 1 and of the support tube 2 or of another frame tube of the bicycle.

The geared motor(s) 4 or the not here presented electric motors each transmit their torque onto the sheave 10 on the front wheel 5 and/or onto the rear wheel 6 by means of a toothed belt 7.

Since the electrical drive units for the front wheel 5 and for the rear wheel 6 are essentially the same, the drive unit for the rear wheel 6 only will be described in detail herein below. According to FIG. 3, the electric motor 14 is securely mounted on the planetary gear set 12, which is provided with the drive shaft 13. The thus-created geared motor 4 is fastened on one side of the bicycle on the support tube 2 by means of a holder 15.

Figure 2:
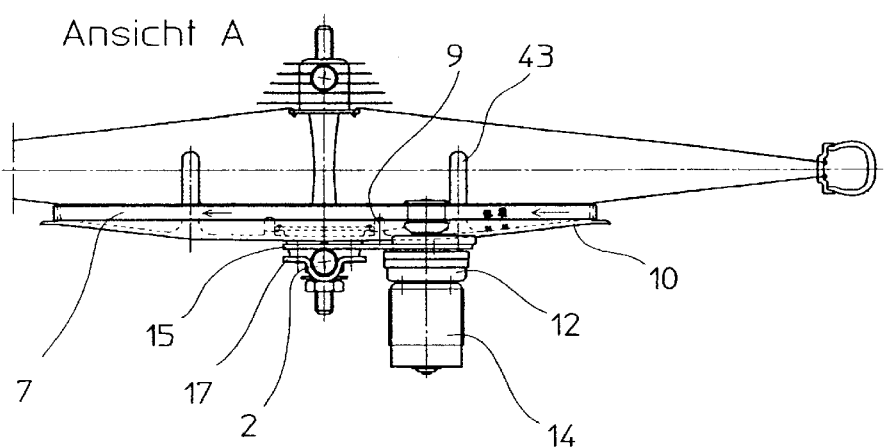
FIG. 2 shows a view in axial direction according to the arrow A in FIG. 1.

According to FIG. 6 the holder 15, which is preferably made of metal, is a curved sheet steel plate of rectangular shape that is provided with a bead 16. Together with a holding strap 17, which is arranged parallel to the bead 16 and which has a semicircular curve, the holder 15 encompasses the support tube 2 (FIG. 2). The holder 15 is securely clamped onto the support tube 2 by means of screws 18 that interconnect the holder 15 and the strap 17. The holder 15 has a locating hole 19 on its end, which is turned away from the strap 17 or from the support tube 2 respectively, an eccentric threaded stem 20 formed on the front side of the planetary gear set 12 or of the motor that is turned away from the motor or from the geared motor 4 engaging said locating hole. The threaded stem 20 is positioned in an eccentric arrangement relative to the output shaft 13 of the planetary gear set 12 or of the not here presented motor (FIG. 5). To affix the geared motor on the holder 15, it is inserted with the threaded stem 20 through the locating hole 19 of the holder 15 and is screwed down with a nut 21 designed as a knurled nut for example (FIG. 7).

The toothed belt 7 is driven by a toothed belt pulley 24, which is rotatably carried in rolling bearings 27 on the drive shaft 13 of the planetary gear set or of the not here presented motor, a sleeve type freewheeling device 28 being pressed firmly between the rolling bearings and jamming the drive shaft 13 during the drive. The toothed belt pulley 24 is maintained axially on the shaft 13 by the retainer ring 13a.

Figure 8:
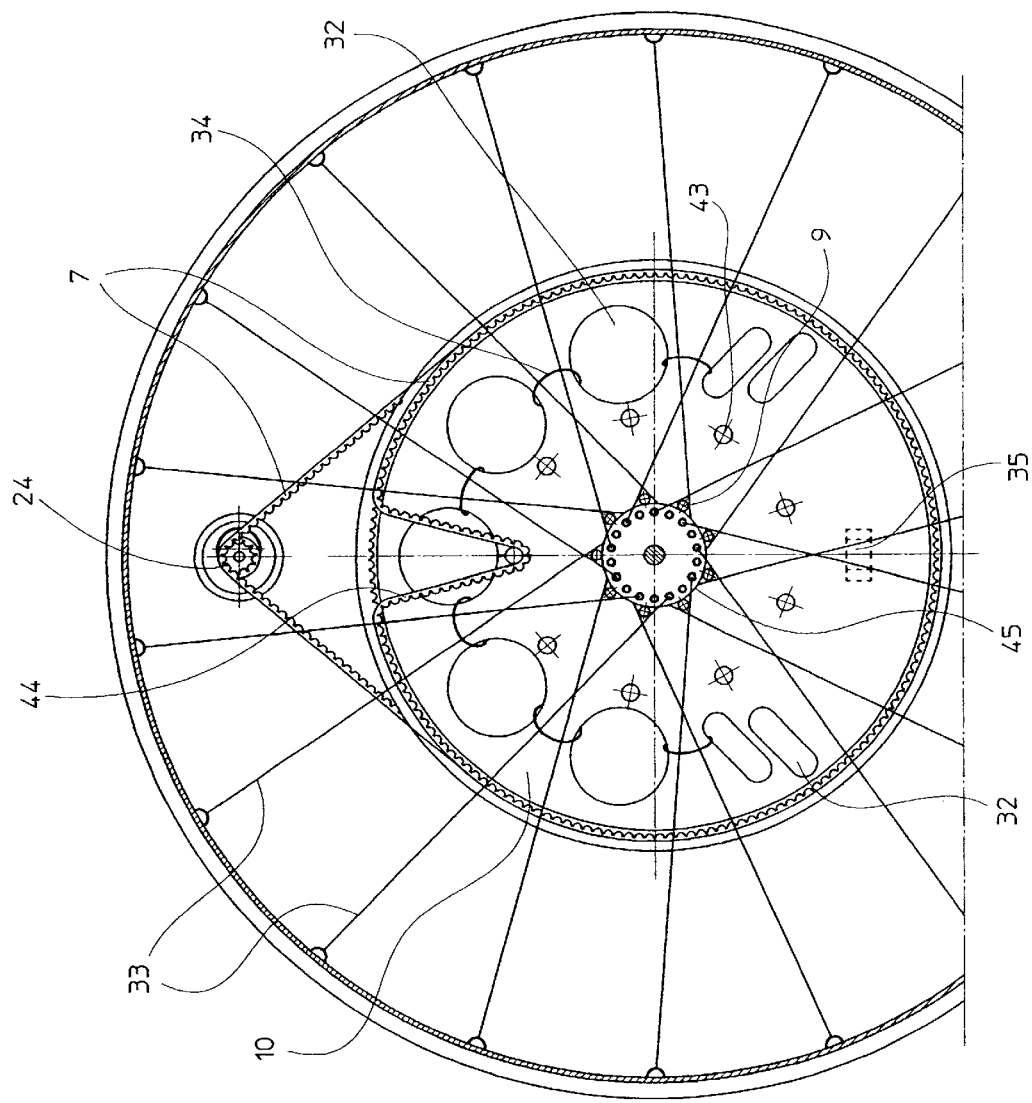
FIG. 8 shows a view of a driven bicycle wheel, wherein the toothed belt loops the drive pulley or is taken off the drive pulley.

The sheave 10 is secured on the rear wheel 6. As more specifically shown in FIGS. 8 and 9, the sheave 10 is provided, to fit the purpose, with a ring of openings 32, which are arranged and distributed around the axis of the wheel 36 in a way such that there are webs between the openings 32. The sheave 10 is fastened onto the rear wheel by cable connectors 34, which are each inserted between two openings 32 and which thus encircle the web and the spoke or spokes located therein between. As sketched in the bottom part of FIGS. 8 and 9, the sheave 10 may be fastened onto the spokes by means of other fastening means 35 than the cable connectors 34. Slots may advantageously be arranged on the elongated belt-supporting ring 39 on the side of the wheel for inserting the spokes.

Figure 9:
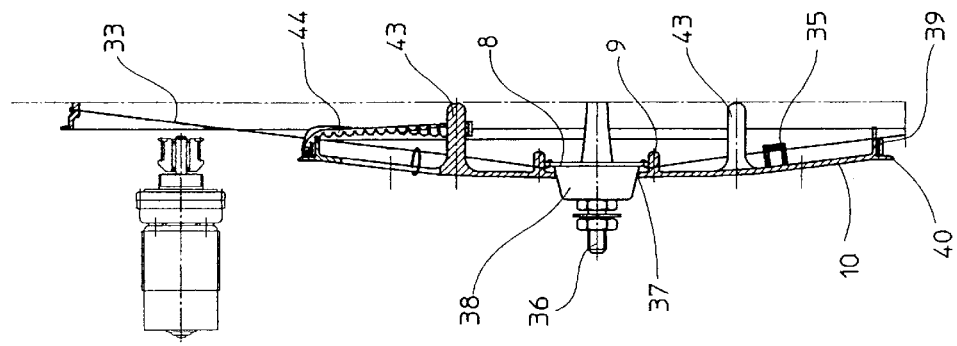
FIG. 9 shows a sectional view of FIG. 8 with the pilot pins looped by the toothed belt.

For centering the sheave 10 on the wheel hub 38, the sheave 10 is provided with centering pins 9 arranged around the axle 36 of the wheel and resting on the spoke flange 8 of the wheel hub 38 and/or the sheave 10 is provided with a central opening 37 by which it is positioned onto the wheel hub 38 for example (FIG. 9).

The sheave 10, which is preferably made of plastic, is provided with a collar 40 on the side of its belt-supporting ring 39 that is turned away from the spokes 33; the toothed belt 7 runs between the collar 40 and the spokes 33. The sheave 10, which is preferably toothed, has a much greater diameter than the drive pulley 24 with toothed belt.

The belt 7 may be taken off the drive pulley 24 in order to forestall the least transmission of torque from the drive pulley 24 onto the bicycle's wheel 6 by the belt 7. To that end the threaded nut 23 is slackened and the motor or geared motor 4 is rotated about its axis, so that the distance between the shaft 13 and the sheave 10 is reduced by its eccentric threaded stem 20.

Thus slackened, the toothed belt 7 may be taken off the drive pulley 24. Then, the nut 23 may be tightened again or the geared motor 4 or the motor is altogether removed.

In order to fasten the toothed belt 7 that has been taken off the drive pulley 24 onto the sheave 10, pilot pins 43 projecting through the spokes 33 are provided on the inner side thereof, the slackened toothed belt 7 being stretched inward about said pins between two spokes 33 in direction of the axis 36 by forming a loop 44.

The here not presented accumulator box (battery) for the power supply of the electric motors 14 may be arranged between the frame tubes 45 and 46 for example. The electric motor 14 may be, if it is geared, a commercial, suitably brushless motor as it is known in model making with a high operating speed and good efficiency of up to 92%. If the motor is gearless, a considerably lower speed is necessary.

What is claimed is:

1. The combination of a bicycle that includes a frame and a wheel mounted on the frame, the wheel including a hub and spokes, and a drive unit for the bicycle, the drive unit including an electric motor mountable on the frame, a sheave which is mountable on the wheel, and a toothed belt which can transmit torque from the electric motor to the sheave, the sheave including a plurality of axial projections arranged in a circle and in contact with a periphery of the hub of the wheel for centering the sheave around the hub of the wheel, and a periphery on which the toothed belt is wrapped, said periphery including projection means for preventing the toothed belt from running off the periphery in a direction away from the wheel spokes.

2. The combination of claim 1, including a holder for mounting the motor on the frame, the holder including a plate with a hole therein.

3. The combination of claim 2, wherein said motor is an electric motor having a drive shaft.

4. The combination of claim 2, wherein said motor is an electric motor connected with a gear means having an output shaft.

5. The combination of claim 4, wherein said gear means comprises a planetary gear set.

6. The combination of claim 4, wherein the gear means includes a threaded stem that can be extended through the hole in the plate and a nut for securing said threaded stem in the hole, said threaded stem being eccentric to said output shaft.

7. The combination of claim 4, including a toothed belt pulley mounted on the output shaft for driving the toothed belt, and a freewheeling device positioned between the output shaft and the toothed belt pulley.

8. The combination of claim 1, wherein the projection means is a radial collar.

9. The combination of claim 1, wherein the sheave includes at least one pilot pin to enable the toothed belt, when disengaged from the motor, to have a slack portion thereof mounted as a loop within the periphery thereof.

10. The combination of claim 1, wherein the sheave includes a plurality of openings arranged in a circle around the central opening thereof, and including a plurality of cable connections which each extend between two adjacent openings and over at least one spoke to attach the sheave to the wheel.

* * * * *